(12) United States Patent
Masser et al.

(10) Patent No.: US 8,930,761 B2
(45) Date of Patent: Jan. 6, 2015

(54) TEST CASE RESULT PROCESSING

(75) Inventors: Joel L. Masser, San Jose, CA (US);
David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 13/598,880

(22) Filed: Aug. 30, 2012

(65) Prior Publication Data

US 2014/0068325 A1   Mar. 6, 2014

(51) Int. Cl.
*G06F 11/25* (2006.01)

(52) U.S. Cl.
USPC ............................................. 714/37

(58) Field of Classification Search
CPC ......... G06F 11/25; G06F 11/08; G06F 11/36; G06F 11/3636; G06F 11/3668; G06F 11/2257; G06F 11/3672; G06F 11/3692
USPC ....................................... 714/1–57
See application file for complete search history.

(56) References Cited

U.S. PATENT DOCUMENTS

| | | |
|---|---|---|
| 6,615,167 B1 | 9/2003 | Devin et al. |
| 6,810,494 B2 | 10/2004 | Weinberg et al. |
| 7,203,928 B2 | 4/2007 | Mandava et al. |
| 7,457,989 B2 | 11/2008 | Ulrich et al. |
| 7,823,132 B2 | 10/2010 | Ulrich et al. |
| 8,151,247 B2 | 4/2012 | Wefers |
| 8,156,475 B2 * | 4/2012 | Choi et al. ................ 717/124 |
| 2003/0097650 A1 | 5/2003 | Bahrs et al. |
| 2006/0010426 A1 | 1/2006 | Lewis et al. |
| 2007/0006037 A1 * | 1/2007 | Sargusingh et al. ........... 714/38 |
| 2008/0104575 A1 * | 5/2008 | Fan et al. ................... 717/124 |
| 2008/0270840 A1 * | 10/2008 | Choi et al. ................... 714/38 |
| 2008/0282231 A1 | 11/2008 | R et al. |
| 2010/0042959 A1 * | 2/2010 | Bhinge et al. ................. 716/4 |
| 2010/0100872 A1 * | 4/2010 | Mitra ....................... 717/125 |
| 2013/0198320 A1 * | 8/2013 | Ahmed et al. ............... 709/217 |

* cited by examiner

*Primary Examiner* — Nadeem Iqbal
(74) *Attorney, Agent, or Firm* — Cantor Colburn LLP; William A. Kinnaman, Jr.

(57) ABSTRACT

A computer-implemented method for test case result processing includes receiving, by a test case result processing logic in a processor of a computer, a test result from a test case that executes on the computer; determining, by the test case result processing logic based on a result description file, whether a result description corresponding to the received result exists in the result description file; based on the result description corresponding to the received result existing in the result description file, determining an action description associated with the result description based on an action definition file; and executing an action corresponding to the determined action description.

20 Claims, 4 Drawing Sheets

| RESULT DESCRIPTION FILE 103 | |
|---|---|
| RESULT DESCRIPTION 105A | ACTION NAME 106A |
| RESULT DESCRIPTION 105B | ACTION NAME 106B |
| RESULT DESCRIPTION 105C | ACTION NAME 106C |
| ...... | |
| RESULT DESCRIPTION 105N | ACTION NAME 106N |

| ACTION DEFINITION FILE 104 | |
|---|---|
| ACTION NAME 106A | ACTION DEFINITION 107A |
| ACTION NAME 106B | ACTION DEFINITION 107B |
| ACTION NAME 106C | ACTION DEFINITION 107C |
| ...... | |
| ACTION NAME 106N | ACTION DEFINITION 107N |
| DEFAULT ACTION DEFINITION 108 | |

TEST CASE RESULT PROCESSING

BACKGROUND

This disclosure relates generally to computer systems, and more particularly to testing of computer software on a computer system.

Quality assurance testing of computer software may be performed using various test cases that are generated by, for example, a test engineer. The expected results of the quality assurance testing of the computer software using a test case may be embedded in the test case itself. This may require changes to the test case if the functionality of the computer software that is being tested changes, or if the expected results are coded incorrectly or incompletely into the test case. Logic changes in the computer system, such as changes in messages, return, error, or reason codes, on which the quality assurance testing is being performed may also introduce errors into a test case, requiring changes to one or more test cases to reflect the logic changes.

SUMMARY

In one aspect, a computer-implemented method for test case result processing includes receiving, by a test case result processing logic in a processor of a computer, a test result from a test case that executes on the computer; determining, by the test case result processing logic based on a result description file, whether a result description corresponding to the received result exists in the result description file; based on the result description corresponding to the received result existing in the result description file, determining an action description associated with the result description based on an action definition file; and executing an action corresponding to the determined action description.

In another aspect, a computer system for test case result processing includes a processor in communication with a memory, the system configured to perform a method including receiving, by a test case result processing logic, a test result from a test case that executes on the computer system; determining, by the test case result processing logic based on a result description file, whether a result description corresponding to the received result exists in the result description file; based on the result description corresponding to the received result existing in the result description file, determining an action description associated with the result description based on an action definition file; and executing an action corresponding to the determined action description.

In yet another aspect, a computer program product includes a computer readable storage medium containing computer code that, when executed by a computer, implements a method for test case result processing, wherein the method includes receiving, by a test case result processing logic, a test result from a test case that executes on the computer; determining, by the test case result processing logic based on a result description file, whether a result description corresponding to the received result exists in the result description file; based on the result description corresponding to the received result existing in the result description file, determining an action description associated with the result description based on an action definition file; and executing an action corresponding to the determined action description.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIGS. 1A-B are schematic block diagrams illustrating an embodiment of a system for test case result processing.

DETAILED DESCRIPTION

Embodiments of systems and methods for test case result processing are provided, with exemplary embodiments being discussed below in detail. The results generated by a test case during quality assurance testing may be handled by separate test case result processing logic, externalizing the definitions of the expected results instead of embedding the results in the test case. Anticipated test case results may be described in a result description file, and actions to take based on the described results may be defined in an action definition file. The test case result processing logic may receive a result from a test case, determine whether the received result is described in the result description file, and then determine and perform an action in response to the received result based on the action definition file. Test cases in the testing system may be standardized to be used in conjunction with the test case result processing logic and associated result description and action definition files. The result descriptions and associated action definitions may be changed, as necessary, in a single location and used across numerous test cases. Therefore, if, for example, external error messages in the testing system are added or changed, the test result descriptions only need to be updated in one place.

When the test case result processing logic receives a result from a test case, the result description file is searched. The received result may be received by the test case processing logic at any appropriate point during the execution of a test case, including but not limited to at completion of the test case. The received result may comprise, for example, an error code, a message, log data, and/or output data. The result descriptions in the result description file may define the test results in any appropriate manner, and the search may be performed based on one or multiple aspects of the received result. If the received result is determined to be listed in the result description file, the action definition file is then searched to determine an associated defined action for the received result. An action definition may include one or multiple steps that are required to complete the associated action. Any appropriate action or set of actions may be associated with any type of result, and a default action may also be provided in the action definition file for unanticipated results that are not listed in the result description file.

Figure 1A:
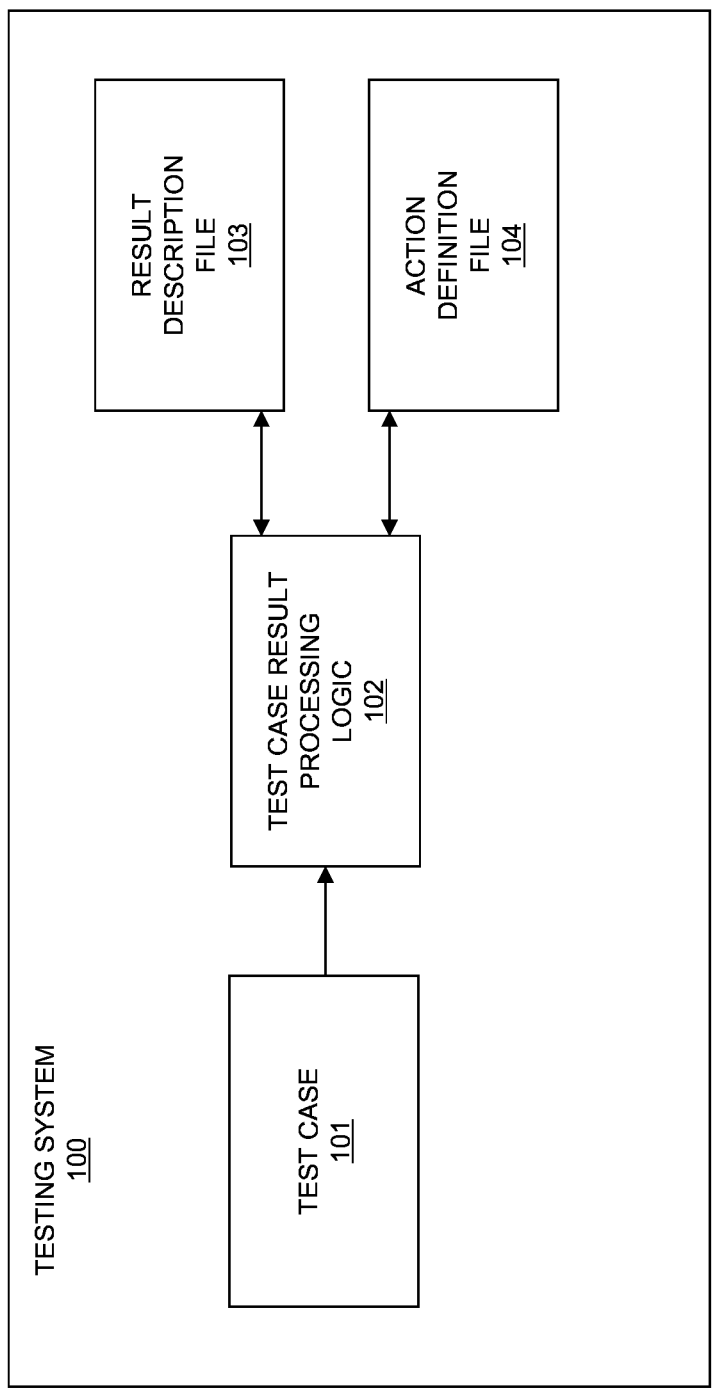

FIG. 1A illustrates an embodiment of a testing system 100 including test case result processing logic 102. The testing system 100 comprises a computer system, and includes a test case 101 that executes on the testing system 100 and interacts with test case result processing logic 102. Results of the execution of test case 101 are sent to test case result processing logic 102. For each received result, the test case result processing logic 102 first searches the result description file 103 to determine if the received result is listed in the result description file 103. If the result description file 103 contains an entry corresponding to the received result, the test case result processing logic 102 then searches the action definition file 104 to determine a defined action or set of actions to take based on the received result. The test case result processing logic 102 then performs the action or set of actions that were determined from the action definition file 104. The action definition file 104 may also provide a default action to take for received results that are not listed in the result description file 103. A plurality of test cases such as test case 101 may be executed on testing system 100, and the test case result processing logic 102, result description file 103, and action definition file 104 may be used in conjunction with the plurality of test cases. Therefore, to change result descriptions and associated actions for the plurality of test cases, only the result description file 103 and action definition file 104 need to be modified. The result description file 103 and action definition file 104 may be defined and modified by, for example, a user such as a test engineer. A test case such as test case 101 may output many possible results, and each result may have a different associated action definition, as described below with respect to FIG. 1B.

FIG. 1B shows embodiments of the result description file 103 and the action definition file 104. As shown in FIG. 1B, the result description file 103 contains one or more result entries, each result entry including a respective result description 105A-B and action name 106A-N. Each entry describes possible results that may be received from a test case such as test case 101. A result description 105A-N may describe a result using any appropriate data, and a result may be determined to be listed in result description file based on one or multiple aspects of the result. The data that is included in a result description 105A-N may include, but is not limited to, one or more of the following: an identification of the function under test by the test case; an error code; a return code; a reason code; a message number; message text or symptom included in message; creation of a dump, including the dump title and/or symptoms; creation of a record in an error log; output data; and log data. The action name 106A-N in each result entry gives a name of an action to take when a received result that is defined by the action name's respective result description 105A-N is received from test case 101. The test case result processing logic 102 searches the result descriptions 105A-N in result description file using data from a received result from test case 101 to determine an action name 106A-N that is associated with the received result.

The action definition file 104 also contains one or more entries, each of which includes a respective action name 106A-N and an action definition 107A-N. The test case result processing logic 102 searches the action names 106A-N in action definition file 104 based on the action name 106A-N that was determined from the result description file 103 to determine the associated action definition 107A-N. Action definitions 107A-N describe in detail the actions that are taken based on a particular result. Some example action definitions that may comprise action definitions 107A-N include collection of problem documentation, recovery from errors, retry, a set of commands to issue, a set of jobs to submit, and/or data to save. Further examples of action definitions 107A-N include: continue the test case as though no error occurred; abort the current test case and continue with a next test case; abort the current test case and rerun the current test case; abort the current test and restart the entire test suite from the beginning; stop the test run, including the current test case and related concurrent test cases; collect specified documentation, such as dumps or logs; stop a tracing operation; quiesce all testing to preserve the error environment; and notify the tester of actions taken. An action definition 107A-N may include any appropriate action or sequence of actions; in the case of a sequence of actions, execution of subsequent actions may be conditional based on the outcome of execution of one or more earlier actions in the sequence. The action definition file 104 further defines a default action 108 to be taken by test case result processing logic 102 when a match for a received result from test case 101 was not found in result descriptions 105A-N in result description file 103; the default action 108 may be any appropriate action or set of actions.

In a first example, a known error in test case 101 for which a fix is not yet available may continue to cause failures during repeated execution of the test case. Such a known error may interfere with the recreation of another error, or with finding new errors, and therefore interfere with the overall progress of testing. Therefore, the known error may be defined in a result description 105A in the result description file 103. The test result description 105A may include an error code that indicates the known error, and may be assigned an action name 106A. The action name 106A may be assigned an associated action definition 107A in the action definition file 104. The action definition 107A may comprise ignoring the known error and continuing execution of the test case 101 when the known error is encountered.

In another example, some results may indicate normal completion of test case 101 in some circumstances, but in other circumstances may indicate an error in the test case. For example, a received result comprising a duplicate data set message may not usually indicate an error, however, in some circumstances a duplicate data set message may be returned falsely by test case 101. Therefore, a duplicate data set message may be listed in result description 105A, and the associated action definition 107A may be include investigation of log or output data from the test case 101 to determine whether the duplicate data set message indicates the presence of an error. In another example, an action definition 107A for a result description 105A that includes a zero return code may include recognizing success of the execution of test case 101 and to continuing to another test case. A received result that includes a non-zero return code may not be listed among result descriptions 105A-N, triggering the default action 108, which may include recognizing failure, stopping the testing, and collecting default documentation.

In yet another example, test case result processing logic 102 may also be applied to a test case 101 that comprises catalog testing. Depending on the outcome of a test case 101, different actions comprising cleanup procedures may be required to allow the next phase of the testing to be performed. The type of cleanup required depends on the nature of an error condition that is the result of the test case 101. An action definition 107A may include multiple types of cleanup steps that may be attempted in a cleanup sequence in response to an error condition defined by result description 105A. Subsequent cleanup steps in the action definition 107A may be conditional based on the success of earlier cleanup steps; depending on whether a prior cleanup step was successful, no subsequent cleanup step may be required. For example, a conditional cleanup sequence defined by an action definition 107A may comprise a first action comprising a delete command issued against the data set name may be sufficient in some circumstances. However, if it the delete command is not successful, then a virtual storage access method (VSAM) volume record or non-VSAM volume record may need to be deleted in a subsequent cleanup step. Further subsequent cleanup actions may require the catalog itself to be deleted and redefined along with aliases. If all cleanup steps in the action definition 107A fail, then functions that follow would not be expected to have a successful result.

In a further example, some received results that comprise message numbers may require different action definitions due to embedded return codes, reason codes, data set names, and/or job names. Specific associated actions may be coded for each of these types of messages. For example, result description 105A and 105B may each include the same message number, but different return codes. Therefore, a received result comprising the message number and a first return code may have a first action definition 107A, and a received result comprising the message number and a second return code may have a second action definition 107B. Any amount of data may be included in a result description 105A-N. Embedded data may be pulled from message text and used to determine a matching result description 105A-N.

In the case of system managed storage (SMS) managed volumes, data may be allocated on any volume with in a pool of volumes. When a result comprising an error event occurs in testing of an SMS system, manual intervention may be required to determine in which volume the error occurred. Manual intervention may also be required to gather the appropriate diagnostic data, and to analyze and clean up after the error. However, test case result processing logic 102 may, based on receiving output messages regarding the error, perform an action comprising analyze job logs from prior jobs to determine if the allocated volumes exist in the job logs from the prior jobs. If the allocated volumes are not listed in the job logs from the prior jobs, the data set names in those job logs may be used to issue a catalog locate to determine the particular volumes where the data resides. Diagnostic data may then be collected against those specific volumes. After the diagnostic data has been collected, an appropriate cleanup method may be issued. The analysis, catalog locate, data collection, and cleanup actions may all be included in an action definition such as action definition 107A that is associated with a result description 105A that describes the error.

Figure 2:
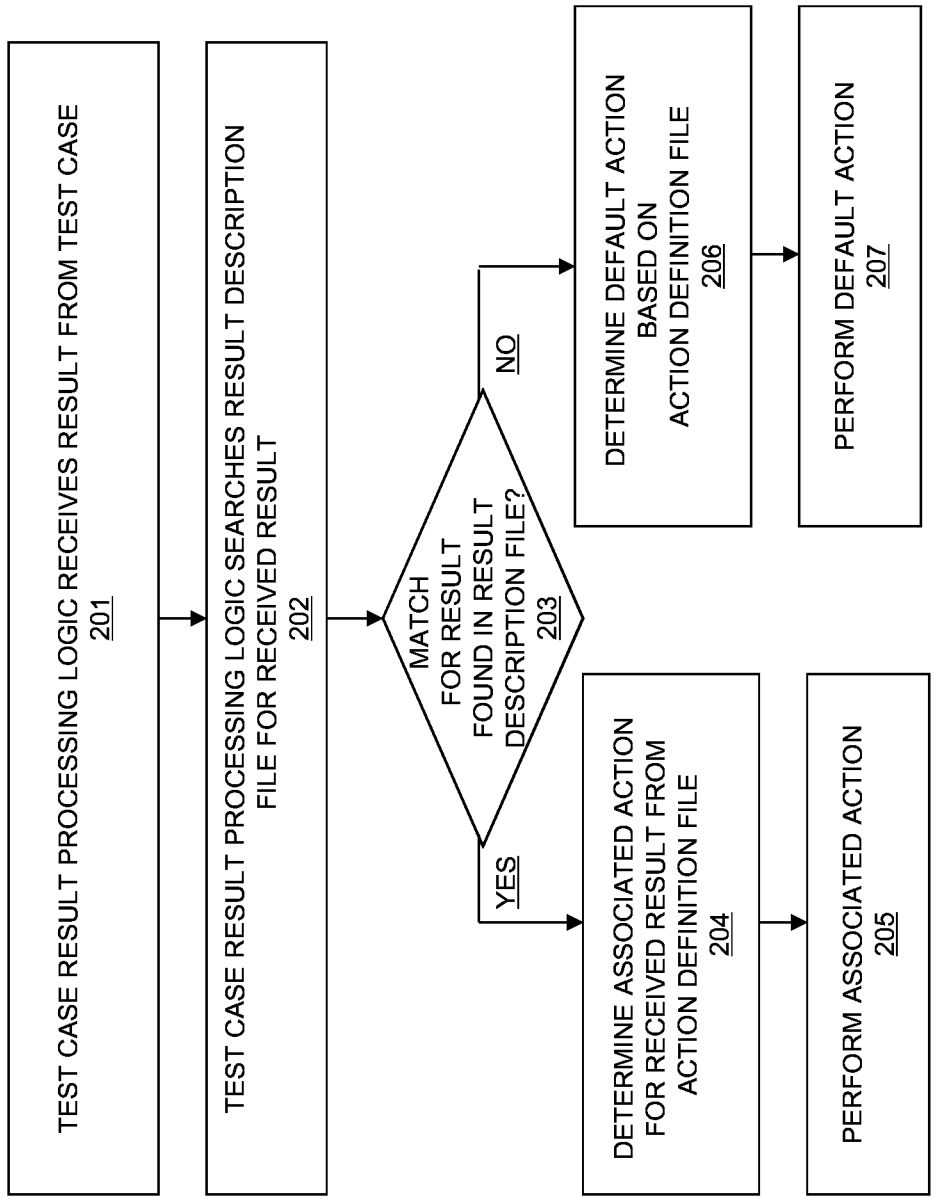
FIG. 2 is a flowchart illustrating an embodiment of a method for test case result processing.

FIG. 2 illustrates an embodiment of a method 200 for test case result processing. FIG. 2 is discussed with respect to FIGS. 1A-B. First, in block 201, the test case result processing logic 102 receives a result from a test case 101. The result may be received by the test case result processing logic 102 from the test case 101 after completion of the test case 101. Next, in block 202, the test case result processing logic 102 searches in the result description file 103 to determine if a match for the received result is listed in the result descriptions 105A-N in the result description file 103. Flow then proceeds to block 203, in which it is determined if a match for the received result was found in the result descriptions 105A-N in result description file 103 by the test case result processing logic 102. Whether a result description of result descriptions 105A-N matches the received result may be determined based on any appropriate data related to the received result. If, in block 203, it was determined that a match for the received result was found in the result description file 103 (for example, result description 105A) by the test case result processing logic 102, flow proceeds to block 204, in which the associated action name 106A for the received result is determined, and the action definition 107A for the action name 106A is determined from the action definition file 104 by test case result processing logic 102. Lastly, in block 205, the action or sequence of actions defined by action definition 107A is performed by the test case result processing logic 102.

However, if, in block 203, it was determined that a match for the received result was not found in the result description file 103 by the test case result processing logic 102, flow proceeds to block 206, in which a default action 108 is determined from the action definition file 104. Lastly, in block 207, the action or sequence of actions defined by default action 108 is performed by the test case result processing logic 102.

Figure 3:
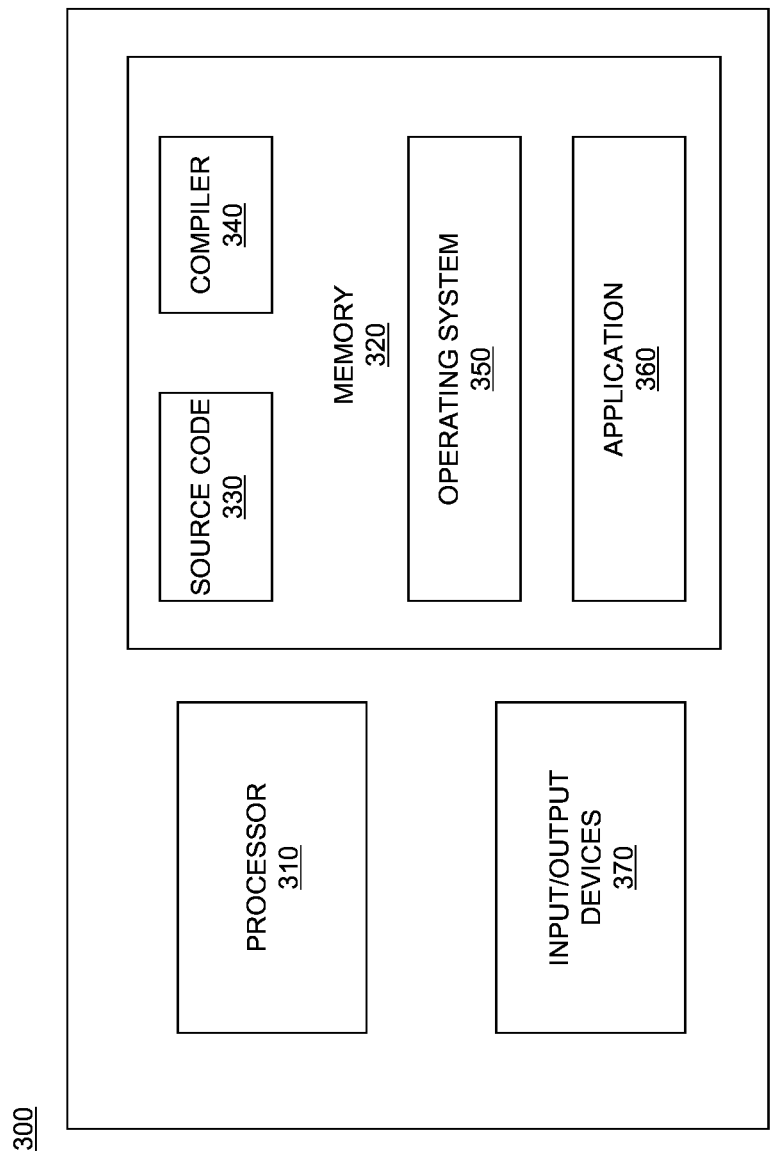
FIG. 3 is a schematic block diagram illustrating an embodiment of a computer for use in conjunction with embodiments of test case result processing.

FIG. 3 illustrates an example of a computer 300 which may be utilized by exemplary embodiments of test case result processing. Various operations discussed above may utilize the capabilities of the computer 300. One or more of the capabilities of the computer 300 may be incorporated in any element, module, application, and/or component discussed herein.

The computer 300 includes, but is not limited to, PCs, workstations, laptops, PDAs, palm devices, servers, storages, and the like. Generally, in terms of hardware architecture, the computer 300 may include one or more processors 310, memory 320, and one or more I/O devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a digital signal processor (DSP), or an auxiliary processor among several processors associated with the computer 300, and the processor 310 may be a semiconductor based microprocessor (in the form of a microchip) or a macroprocessor.

The memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and one or more applications 360 in accordance with exemplary embodiments. As illustrated, the application 360 comprises numerous functional components for implementing the features and operations of the exemplary embodiments. The application 360 of the computer 300 may represent various applications, computational units, logic, functional units, processes, operations, virtual entities, and/or modules in accordance with exemplary embodiments, but the application 360 is not meant to be a limitation.

The operating system 350 controls the execution of other computer programs, and provides scheduling, input-output control, file and data management, memory management, and communication control and related services. It is contemplated by the inventors that the application 360 for implementing exemplary embodiments may be applicable on all commercially available operating systems.

Application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such as the Internet or intranet.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include configurable processing of results received from multiple test cases during testing of computer software.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for test case result processing, comprising:
   receiving, by a test case result processing logic in a processor of a computer, a test result from a test case that executes on the computer;
   determining, by the test case result processing logic, based on a result description file, whether a result description corresponding to the received result exists in the result description file, wherein the result description file comprises a plurality of result descriptions, and wherein each result description of the plurality of result descriptions in the result description file has a respective corresponding action name in the result description file;

based on the result description corresponding to the received result existing in the result description file, determining the action name corresponding to the received result based on the result description file;

determining, based on an action definition file, an action description corresponding to the action name that was determined based on the result definition file, wherein the action definition file comprises a plurality of action names, and wherein each action name of the plurality of action names in the action definition file has a respective corresponding action definition in the action definition file; and executing an action corresponding to the determined action description.

2. The method of claim 1, wherein the executed action comprises a sequence of actions.

3. The method of claim 2, wherein the sequence of actions comprises a conditional sequence of actions, wherein execution of a second action in the sequence of actions is conditional based on execution of a first action in the sequence of actions.

4. The method of claim 1, wherein the test case result processing logic is configured to receive test results from a plurality of test cases on the computer.

5. The method of claim 1, wherein the result description comprises one or more of: an identification of a function under test by the test case; an error code; a return code; a reason code; a message number; message text, a symptom included in message; a title of a dump created by the test case, a symptom of the dump created by the test case; creation of a record in an error log; output data; and log data.

6. The method of claim 1, wherein determining whether the result description corresponding to the received result exists in the result description file comprises:

extracting embedded information from the received result; and determining a match for the received result and the extracted embedded information in the result description file.

7. The method of claim 1, wherein the executed action comprises one or more of:

aborting the test case and starting a second test case; aborting and restarting the test case; aborting the test case and restarting a test suite associated with the test case; and stopping the test suite.

8. A computer system for test case result processing, the system comprising:

a processor in communication with a memory, the system configured to perform a method comprising:

receiving, by a test case result processing logic in a processor of a computer, a test result from a test case that executes on the computer;

determining, by the test case result processing logic, based on a result description file, whether a result description corresponding to the received result exists in the result description file, wherein the result description file comprises a plurality of result descriptions, and wherein each result description of the plurality of result descriptions in the result description file has a respective corresponding action name in the result description file;

based on the result description corresponding to the received result existing in the result description file, determining the action name corresponding to the received result based on the result description file;

determining, based on an action definition file, an action description corresponding to the action name that was determined based on the result definition file, wherein the action definition file comprises a plurality of action names, and wherein each action name of the plurality of action names in the action definition file has a respective corresponding action definition in the action definition file; and executing an action corresponding to the determined action description.

9. The system of claim 8, wherein the executed action comprises a sequence of actions.

10. The system of claim 9, wherein the sequence of actions comprises a conditional sequence of actions, wherein execution of a second action in the sequence of actions is conditional based on execution of a first action in the sequence of actions.

11. The system of claim 8, wherein the test case result processing logic is configured to receive test results from a plurality of test cases on the computer system.

12. The system of claim 8, wherein determining whether the result description corresponding to the received result exists in the result description file comprises:

extracting embedded information from the received result; and determining a match for the received result and the extracted embedded information in the result description file.

13. A computer program product comprising a computer readable storage medium containing computer code that, when executed by a computer, implements a method for test case result processing, wherein the method comprises:

receiving, by a test case result processing logic in a processor of a computer, a test result from a test case that executes on the computer;

determining, by the test case result processing logic, based on a result description file, whether a result description corresponding to the received result exists in the result description file, wherein the result description file comprises a plurality of result descriptions, and wherein each result description of the plurality of result descriptions in the result description file has a respective corresponding action name in the result description file;

based on the result description corresponding to the received result existing in the result description file, determining the action name corresponding to the received result based on the result description file;

determining, based on an action definition file, an action description corresponding to the action name that was determined based on the result definition file, wherein the action definition file comprises a plurality of action names, and wherein each action name of the plurality of action names in the action definition file has a respective corresponding action definition in the action definition file; and executing an action corresponding to the determined action description.

14. The computer program product according to claim 13, wherein the executed action comprises a sequence of actions.

15. The computer program product according to claim 14, wherein the sequence of actions comprises a conditional sequence of actions, wherein execution of a second action in the sequence of actions is conditional based on execution of a first action in the sequence of actions.

16. The computer program product according to claim 13, wherein the test case result processing logic is configured to receive test results from a plurality of test cases on the computer.

17. The computer program product according to claim 13, wherein determining whether the result description corresponding to the received result exists in the result description file comprises:
- extracting embedded information from the received result; and
- determining a match for the received result and the extracted embedded information in the result description file.

18. The method of claim 1, further comprising, based on the result description corresponding to the received result not existing in the result description file:
- determining a default action that is defined in the action definition file; and
- performing the default action.

19. The system of claim 8, further comprising, based on the result description corresponding to the received result not existing in the result description file:
- determining a default action that is defined in the action definition file; and
- performing the default action.

20. The computer program product according to claim 13, further comprising, based on the result description corresponding to the received result not existing in the result description file:
- determining a default action that is defined in the action definition file; and
- performing the default action.

* * * * *